(12) United States Patent
Ishida

(10) Patent No.: US 7,085,572 B2
(45) Date of Patent: Aug. 1, 2006

(54) WIRELESS BASE STATION AND A WIRELESS PHONE

(75) Inventor: Akira Ishida, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/923,825

(22) Filed: Aug. 24, 2004

(65) Prior Publication Data

US 2005/0037788 A1    Feb. 17, 2005

Related U.S. Application Data

(63) Continuation of application No. 09/781,545, filed on Feb. 13, 2001, now Pat. No. 6,889,047.

(30) Foreign Application Priority Data

Feb. 14, 2000    (JP)    ............................... 2000-35972

(51) Int. Cl.
    *H04B 7/01*    (2006.01)
(52) U.S. Cl. .................. 455/450; 455/562.1; 455/513; 370/329; 370/342; 375/267; 375/347
(58) Field of Classification Search ............ 455/562.1, 455/456.2, 513, 436, 450, 414.1, 452.1, 69, 455/434; 370/329, 431, 342; 342/383, 11; 375/267, 299, 347
    See application file for complete search history.

(56) References Cited

U.S. PATENT DOCUMENTS

| 4,686,673 A | * | 8/1987 | Hotta | .......................... 370/324 |
|---|---|---|---|---|
| 6,009,124 A | | 12/1999 | Smith et al. | |
| 6,087,986 A | | 7/2000 | Shoki et al. | |
| 6,141,335 A | | 10/2000 | Kuwahara et al. | |
| 6,169,910 B1 | | 1/2001 | Tamil et al. | |
| 6,240,098 B1 | | 5/2001 | Thibault et al. | |
| 6,256,304 B1 | | 7/2001 | Vayrynen | |
| 6,330,459 B1 | | 12/2001 | Crichton et al. | |
| 6,363,059 B1 | | 3/2002 | Kranz et al. | |
| 6,385,457 B1 | | 5/2002 | Dam et al. | |
| 6,522,898 B1 | | 2/2003 | Kohno et al. | |
| 6,728,228 B1 | | 4/2004 | Ostman et al. | |
| 2004/0048616 A1 | | 3/2004 | Kobylinski et al. | |

FOREIGN PATENT DOCUMENTS

JP    2002-508915    3/2002

* cited by examiner

*Primary Examiner*—Edan Orgad
(74) *Attorney, Agent, or Firm*—Arent Fox, PLLC

(57) ABSTRACT

On receiving a link channel assignment request or a link channel reassignment request from a mobile station, a wireless base station specifies a unique word (UW) that is not assigned to any other mobile stations, and sends a channel assignment notification containing the specified UW to the requesting mobile station. The base station also sends the specified UW to its user processing unit, which extracts a signal sent from the requesting mobile station and generates a signal to be sent to this mobile station. The base station then defines a reference signal based on the sent UW, and adjusts each weight vector by using the defined reference signal and a signal estimated to have been sent from the requesting mobile station, thereby directing the directivity pattern to the requesting mobile station.

2 Claims, 9 Drawing Sheets

FIG. 4

| UNIQUE WORD | ASSIGNMENT STATE |
|---|---|
| 0011110101001100 | USER 1 |
| 0110100000011001 | USER 2 |
| 1001011111100110 | NOT ASSIGNED |
| 1100001010110011 | NOT ASSIGNED |

WIRELESS BASE STATION AND A WIRELESS PHONE

This is a Continuation of application Ser. No. 09/781,545 filed Feb. 13, 2001 now U.S. Pat. No. 6,889,047. The disclosure of the prior application is hereby incorporated by reference herein in its entirety.

BACKGROUND OF THE INVENTION (1) Field of the Invention

The present invention relates to a wireless base station that wirelessly communicates with a plurality of mobile stations, such as PHS (Personal Handyphone System) mobile phones and cellular phones, by using SDM (space division multiplexing), and to a communication technique thereof.

(2) Description of the Prior Art

As the increasing number of mobile stations, such as a PHS mobile phone and a cellular phone, are in widespread use, the need for effective use of a limited number of transmission frequencies arises high. The SDM (Space Division Multiplexing) is one method responding to such need.

With the SDM, a wireless base station simultaneously communicates with a plurality of mobile stations located in various directions via the same frequency, using directional antennas.

An adaptive array antenna device is one form of such directional antenna used in the SDM communication. The adaptive array antenna device comprises a plurality of antenna elements that are fixed, and shapes a directivity pattern (which is also called an array antenna pattern) used for signal transmission and reception by dynamically changing an amplitude and a phase of a signal received/sent via each antenna element.

When producing a directivity pattern, the adaptive array antenna device not only raises sending strength and receiving sensitivity in a direction in which a desired mobile station exists, but also lowers sending strength and receiving sensitivity in a direction of other mobile stations with which he base station communicates using the SDM. The detailed explanation of an adaptive array antenna device is given by "Special Papers on Signal Processing in a Space Domain and Technology thereof" in The Institute of Electronics, Information, and Communication Engineers Transaction VOL. J75-B-2 No. 11.

In a wireless base station that uses an adaptive array antenna device as sending/receiving antennas, the directivity pattern is changed in accordance with a movement of each mobile station so as to minimize interference caused by other connections and maintain good transmission quality. The following describes operations to control directivity pattern-shaping according to a minimum mean squared error (MMSE) method when a signal is received or sent with an assumption that the total number of antenna elements included in the adaptive array antenna device is "N".

For a signal reception, the directivity pattern is controlled so as to separate a signal, which has been sent from a desired mobile station, from data into which a plurality of signals of other mobile stations are multiplexed.

FIG. 9 shows representation of the MMSE controlling operation performed when the adaptive array antenna device receives signals from mobile stations.

$$y(t)=w(t-1)^*x(t)=w_1(t-1)^*x_1(t)+w_2(t-1)^*x_2(t)+ \ldots \\ w_N(t-1)^*x_N(t) \qquad \text{Expression 1}$$

In Expression 1, "$x_1(t)$", "$x_2(t)$" ... "$x_N(t)$" each represent a vector of a reception signal received via one of the antenna elements, and "$w_1(t-1)$", "$w_2(t-1)$" ... "$w_N(t-1)$" each represent a weight vector corresponding to each antenna element. As shown in the figure and Expression 1, a sum of reception signal vectors multiplied by weight vectors corresponding to the plurality of antenna elements is regarded as a signal "y(t)" sent from a desired mobile station. A value of each weight vector needs to be adjusted to correctly obtain the desired signal "y(t)"

In Expression 1, "t" represents a time at which a signal is received by each antenna element. For instance, "t" may be a value showing an elapsed time represented in a unit of a time required to receive one symbol within a time slot in a standard related to PHS system in Japan. Hereafter, this standard is called a "PHS standard". Accordingly, a value of "t" in each of the above reception signal vectors "x" and weight vectors "w" changes from "1" to "2" . . . , and so each of the reception signal vectors and weight vectors is a signal sequence. Each weight vector is a parameter used for shaping the directivity pattern. Each weight vector and each reception signal vector is a signal, which is shown as a complex vector and has an amplitude and a phase.

Each weight vector has a predetermined value as its initial value. This initial value is updated within a predetermined range at predetermined times in a manner that minimizes an error between the desired signal "y(t)" and a reference signal "d(t)". The reference signal "d(t)" contains a part, such as a preamble (PR) and a unique word (UW) for synchronization defined in the PHS standard, of a signal sent from a mobile station, and has a predetermined fixed value.

$$e(t)=d(t)-y(t)=d(t)-w(t-1)^*x(t) \qquad \text{Expression 2}$$

This is to say, a weight vector "w(t-1)" is adjusted to "w(t)" so as to minimize the error "e(t)" between the reference signal "d(t)" and the desired signal "y(t)", i.e., the separation result. In theory, a wight vector converges to a certain value over time so that quality of the desired signal "y(t)" gradually raises. Since a mobile station first sends a PR and a UW making up the reference signal, and then sends body data (the content of the communication), quality of the desired signal "y(t)" somewhat improves by the time the body data is received. After a phone conversation starts, a value of the weight vector obtained in the immediately preceding time slot is used as the initial value of the current wight vector.

When interference between different connections of a plurality of mobile stations is not likely to occur due to locations of the mobile stations or for other reasons, the wireless base station not only uses the SDM, but also shapes the directivity pattern in accordance with directions of these mobile stations, or staggers receiving/sending times for the plurality of mobile stations by a duration taken by, for instance, a transmission of one symbol in each time slot so as to minimize interface.

For a transmission to each mobile station, the directivity pattern is controlled as follows. A signal to be sent to a desired mobile station is distributed to each antenna element. After this, another signal is generated by multiplying, for each antenna element, the distributed signal by a weight vector that was lastly obtained corresponding to each antenna element during reception. After this, all the plurality of antenna elements simultaneously transmit generated signals. As a result, the directivity is pointed to the desired mobile station, so that transmit gain control is achieved, and an unnecessary signal is not transmitted to other interfering users.

In this way, during a reception of a signal, the wireless base station adjusts wight vectors based on: (a) signals received via a plurality of antenna elements; and (b) information, such as a PR and an UW, which has predetermined content. By doing so, the wireless base station can extract a desired signal from other signals. During a transmission to a mobile station, the wireless base station points the directivity to the mobile station using the above weight vectors used during the reception. In this way, the wireless base station communicates with different mobile stations using the SDM while minimizing interference to maintain relatively good communication quality.

SUMMARY OF THE INVENTION

Under the control of the above conventional wireless base station, interference with other connections are suppressed such as by precisely staggering sending times of different mobile stations communicating with the base station using the SDM. Without using such complex interference-suppressing method, the present invention aims to provide a wireless base station and a wireless phone (mobile station), with which interference can be suppressed to maintain good communication quality.

To achieve the above object, a wireless base station of the present invention wirelessly communicates with a plurality of mobile stations by using space division multiplexing (SDM). Each mobile station sends communication data containing an identifier (ID) to the wireless base station. The wireless base station includes: an association information storing unit for storing association information that associates each of the plurality of mobile stations with a different ID; a receiving unit for receiving data into which communication data sent from the plurality of mobile stations is space-division multiplexed; and an extracting unit for (a) specifying an ID associated with each mobile station by referring to the association information, and (b) extracting, from the received data, communication data sent from the mobile station by using the specified ID.

For this construction, the plurality of mobile stations each send communication data containing a different UW to the mobile station. Each UW is used as a part of a reference signal, which is used to correctly separate and extract communication data, which has been sent from a desired mobile station and multiplexed into a received signal, according to the MMSE method or the like. In accordance with results of the extraction, the base station can suitably direct the directivity pattern in a direction of each mobile station. Accordingly, the base station can communicate with each mobile station using the SDM while reducing interference and maintaining good communication quality.

Here, the association information may include a plurality of IDs and state information that shows the plurality of mobile stations as being associated with the plurality of IDs. The wireless base station may further include: a request receiving unit for receiving a request for assignment of a channel from a mobile station out of the plurality of mobile stations; and an assigning unit for (a) specifying an ID for the requesting mobile station when the request has been received, wherein the specified ID differs from an ID associated with another mobile station, with which the wireless base station currently communicates using the SDM, (b) updating the state information by associating the specified ID with the requesting mobile station, and (c) sending information to the requesting mobile station, wherein the sent information shows the specified ID and a channel assigned to the mobile station.

The above wireless base station sends a UW to a requesting mobile station when assigning a channel to the mobile station. This UW differs from UWs that have been sent to other mobile stations that communicate with the base station using the SDM, and therefore the requesting mobile station can send communication data containing this UW differing from other UWs. This allows the base station to suitably separate and extract the sent communication data.

Here, the wireless base station may further include an association deleting unit for deleting, when a communication with a mobile station is completed, an association between the mobile station and an associated ID from the association information.

After completing SDM communication with a mobile station, the above wireless base station can assign a UW which was associated with this mobile-station to another mobile station with which the base station starts communication.

Here, the wireless base station may further include: an ID receiving unit for receiving an ID from a mobile station out of the plurality of mobile stations; and an updating unit for updating the association information by associating the received ID with the mobile station that sent the ID when the ID has been received.

For this construction, the wireless base station can use a UW sent from a mobile station as a part of a reference signal. By using this reference signal, the wireless base station can correctly extract space-division multiplexed communication data of the mobile station from a signal according to the MMSE method.

Here, the wireless base station may further include: an ID receiving unit for receiving an ID from a mobile station out of the plurality of the mobile stations; and a sending/updating unit for (a) referring to the association information when the ID has been received, (b) notifying the mobile station that an ID differing from the received ID should be sent if the association information associates the received ID with another mobile station, and (c) updating the association information by associating the received ID with the mobile station that sent the ID if the association information does not associate the received ID with any mobile station.

This construction prevents a mobile station from using the same UW as used by another mobile station communicating with the wireless base station using the SDM.

Here, for the wireless base station, when the receiving unit has received the data, the extracting unit may also (a) obtain a plurality of first signals from the received data, (b) obtain a second signal estimated to have been sent from each of the plurality of mobile stations, using the plurality of obtained first signals and a plurality of weight vectors that are vector factors, (c) specify an ID associated with each mobile station by referring to the association information, (d) define a reference signal containing the specified ID, (e) compare a component of the defined reference signal with a component of the obtained second signal to detect a difference between the two components, each component corresponding to a same predetermined period, (f) adjust the second signal by adjusting each weight vector so as to minimize the difference, and (g) regard the adjusted second signal as communication data sent from the mobile station, thereby extracting the communication data.

For this construction, it is possible to use a UW as a reference signal and to adjust each weight vector using this reference signal according to the MMSE method. Therefore, the wireless base station can correctly separate and extract a signal sent from each mobile station, and suitably direct the directivity pattern to each mobile station to send a signal.

The present invention also relates to a wireless phone, including: a receiving unit for receiving an identifier (ID) sent from a wireless base station; and a sending unit for sending communication data containing the received ID to the wireless base station.

With this construction, each mobile station sends communication data containing a UW which has been assigned by the wireless base station. By having the wireless base station assign a different UW to each mobile station with which the base station communicates using the SDM, it becomes possible for the wireless base station to suitably separate and extract communication data of each mobile station.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is a block diagram showing a user processing unit 51a;

FIG. 4 shows a data construction and example contents of unique word (UW) information;

DESCRIPTION OF THE PREFERRED EMBODIMENTS

The following describes a wireless base station and mobile stations of the present invention, using several embodiments.

First Embodiment

Construction

Figure 1:
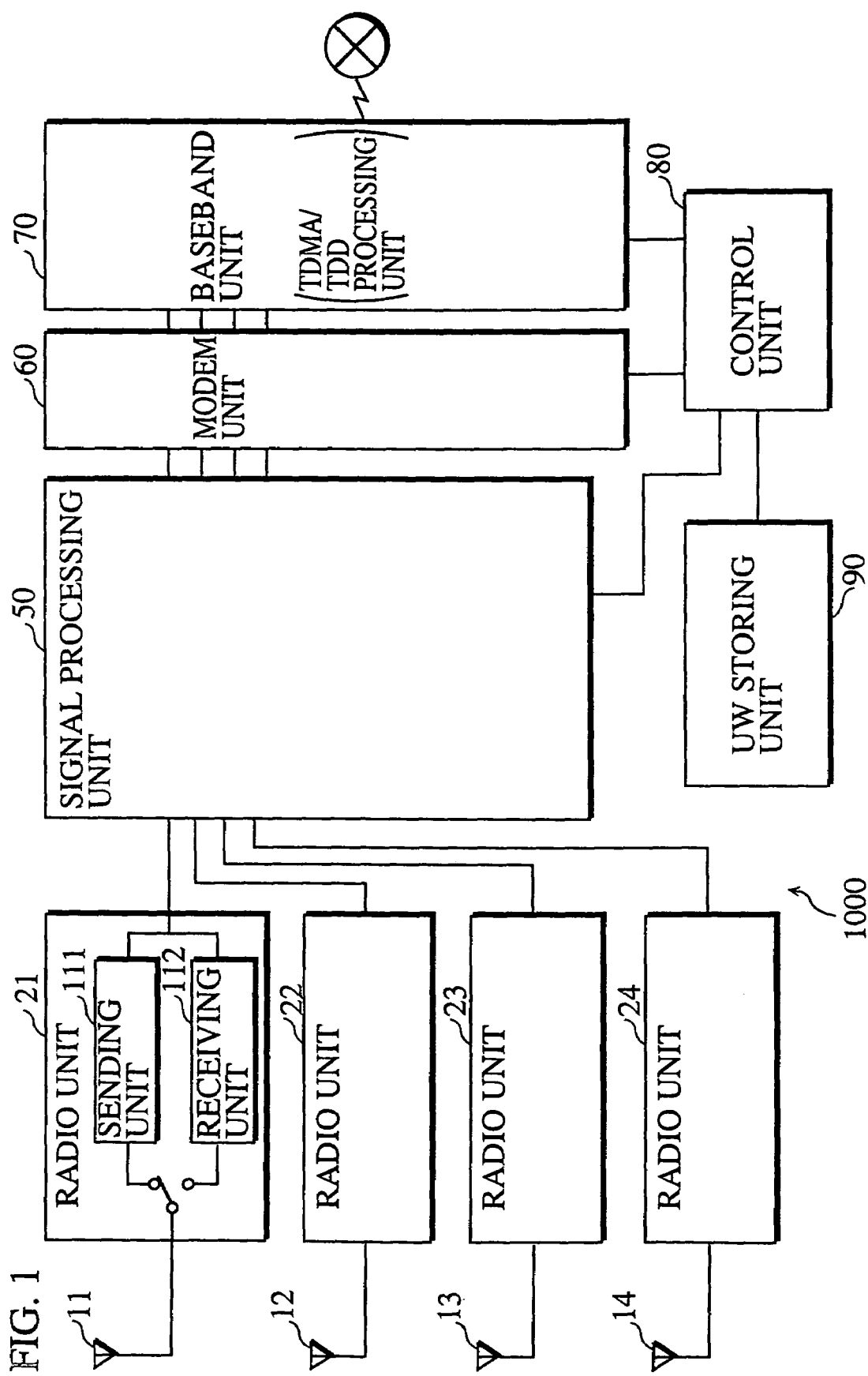
FIG. 1 is a block diagram showing a construction of a wireless base station 1000 of the first embodiment.

FIG. 1 is a block diagram showing a construction of the wireless base station of the first embodiment.

The wireless base station 1000 uses the SDM method as well as a TDMA/TDD (Time Division Multiple Access/ Time Division Duplex) method. The wireless base station 1000 wirelessly communicates with mobile stations which are PHS mobile phones by multiplexing four signals at most in the SDM via the same frequency. Hereafter, when a signal is multiplexed in the SDM and the TDM, the signal is said to be "SD-multiplexed" and "TD-multiplexed", respectively. The wireless base station 1000 comprises antennas 11~14, radio units 21~24, a signal processing unit 50, a modem unit 60, a baseband unit 70, a control unit 80, and a UW storing unit 90.

The wireless base station 1000 has four channels in each TDMA/TDD frame in accordance with the PHS standard, and processes, in parallel, four signals for four telephone lines, which, are SD-multiplexed into a single channel. Each TDMA/TDD frame corresponds to a duration of five msec and is divided into eight time slots composed of four sending time slots and four receiving time slots. Each time slot corresponds to a TDM/TDD channel.

The baseband unit 70 transfers a plurality of signals, such as a baseband signal for sound or data, between the signal processing unit 50 and a telephone switching network connected to a plurality of telephone lines.

The modem unit 60 modulates and demodulates a digitized baseband signal according to π/4 Shift QPSK (Quadrature Phase Shift Keying). This modulation and demodulation are performed in parallel on four. TDMA/TDD frames at most that are SD-multiplexed in each TDM/TDD channel.

The signal processing unit 50 controls shaping of a directivity pattern under the control of the control unit 80. In more detail, from each of the radio units 21~24, the signal processing unit 50 receives a signal and separates, from the received signal, a signal which has been sent by a mobile station and SD-multiplexed into the received signal. The signal processing unit 50 then sends the separated signal to the modem unit 60. The signal processing unit 50 also receives signals from the modem unit 60, generates a signal using the received signals to be SD-multiplexed, and sends the generated signal to a corresponding radio unit out of the radio units 21~24 so as to allow each signal sent from the modem unit 60 to be transmitted to a desired mobile station. The signal processing unit 50 can be achieved by a programable DSP (Digital Signal Processor). Using the aforementioned MMSE method, the signal processing unit 50 shapes the directivity pattern for each time slot in four or less TDMA/TDD frames, which are processed by the modem unit 60 in parallel. During a reception of a signal from a mobile station, the signal processing unit 50 shapes the directivity pattern by adjusting each weight vector in such a way that minimizes an error between a reference signal and a signal estimated to have been sent from a desired mobile station. This estimated signal is a sum of weight vectors of the radio units 21~24 multiplied respectively by signals received by the radio units 21~24. During a signal transmission to a mobile station, the signal processing unit 50 shapes the directivity pattern by distributing signals to the radio units 21~24 based on weight vectors that were obtained during the most recent reception.

Note that the signal processing unit 50 shapes the directivity pattern in accordance with the SDM to send and receive a signal only when the transmission is performed via a traffic channel (hereafter, "T channel"). When a signal is transferred via other control channels, the wireless base station 1000 controls this transfer in a similar way to a conventional wireless base station without using the SDM. Also note that a different reference signal is used for each mobile station, and this will be described in detail later.

The radio units 21~24 have the same construction. The radio unit 21, for instance, includes a sending unit 111 and a receiving unit 112, which respectively contain a high-power amplifier and a low-noise amplifier.

The sending unit 111 receives a LF (low frequency) signal from the signal processing unit 50, converts the received LF signal into an HF (high frequency) signal, and amplifies the HF signal to a sending power output level. The sending unit 111 then outputs the amplified HF signal to the antenna 11. The sending unit 111 controls the sending power output such as by controlling a gain of the high-power amplifier under control of the control unit 80.

The receiving unit 112 receives an HF signal which has been received by the antenna 11, and converts the received HF signal into a LF signal. The receiving unit 112 then amplifies the LF signal, and outputs the amplified LF signal to the signal processing unit 50.

The control unit 80 is achieved specifically by a CPU (central processing unit), memory, and the like, and controls other units of the wireless base station 1000 by having the CPU execute a program stored in the memory.

The UW storing unit 90 stores a plurality of UWs to be assigned to a plurality of mobile stations whose signals are SD-multiplexed together. The UW storing unit 90 also stores UW information, which associates each UW with a different mobile station to which the UW has been assigned. This UW information will be described in detail later.

Figure 2:
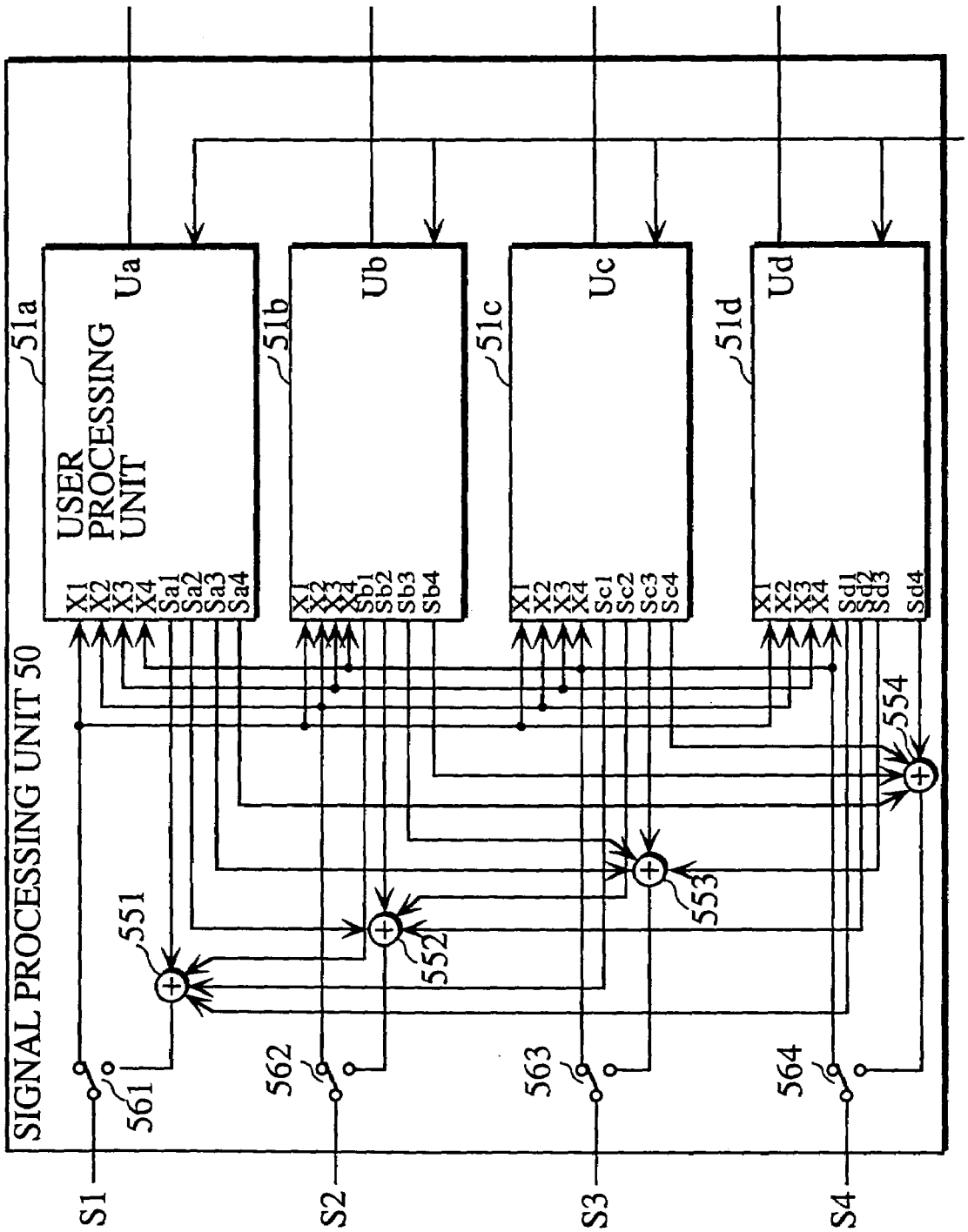
FIG. 2 is a block diagram showing a signal processing unit 50.

FIG. 2 is a block diagram showing a construction of the signal processing unit 50.

The signal processing unit 50 includes send/receive switches 561~564, adders 551~554, and user processing units 51a~51d.

The user processing units 51a~51d adjusts a weight vector in each time slot of a TDMA/TDD frame so as to correctly transfer a signal to/from each mobile station. In more detail, the user processing units 51a~51d each receive signals X1~X4 which are respectively outputted from the radio units 21~24. The user processing units 51a~51d also outputs signals Sa~Sd to the radio units 21~24. This is to say, the user processing units 51a~51d each extract a signal of a desired mobile station, and generates a signal to be outputted to the radio units 21~24 from signals which are outputted by the modem unit 60 and which include a signal to be sent to the mobile station.

The send/receive switches 561~564 are switched under the control of the control unit 80.

The adders 551~554 each add signals adjusted by the user processing units 51a~51d together to generate a signal, and outputs the generated signal to one of the radio units 21~24.

Figure 3:
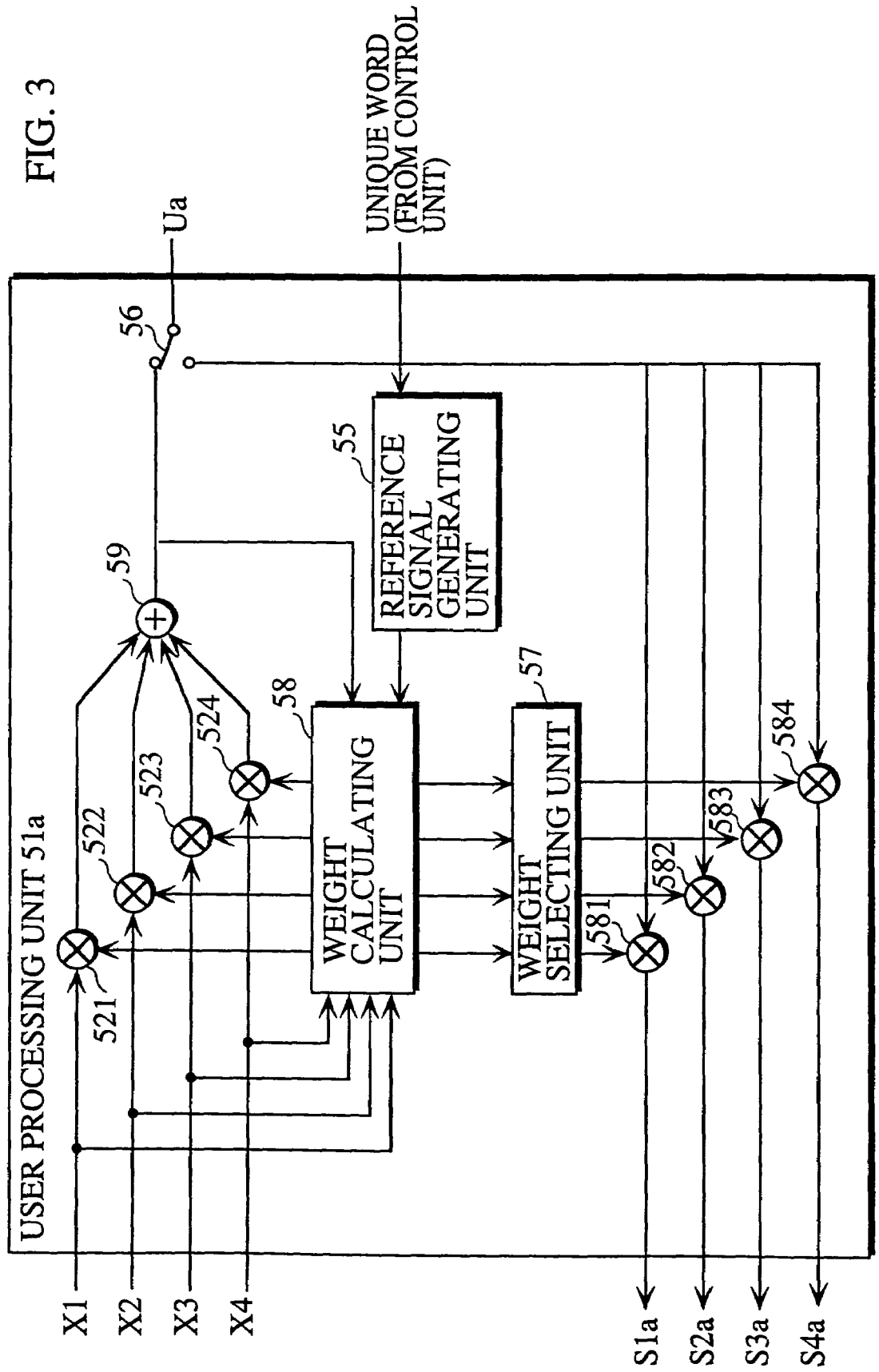

FIG. 3 is a block diagram showing a construction of the user processing unit 51a.

The user processing unit 51a includes multipliers 521~524 and 581~584, an adder 59, a send/receive switch 56, a reference signal generating unit 55, a weight calculating unit 58, and a weight selecting unit 57.

The reference signal generating unit 55 generates a reference signal which is an ideal signal estimated to have been sent from a desired mobile station, using a UW and information fixed in the PHS standard, other than the UW. This fixed information contains a start symbol (SS) and a PR. The UW used to generate a reference signal is outputted from the control unit 80 to the reference signal generating unit 55. Since the control unit 80 outputs a different UW to each user processing unit, reference signals generated by reference signal generating units in the user processing units 51a~51d differ from one another.

The weight calculating unit 58 adjusts a weight vector in the MMSE. In more detail, the weight calculating unit 58 multiplies signals X1~X4 outputted respectively from the radio units 21~24 by weight vectors-corresponding to the signals X1~X4. The weight calculating unit 58 then regards a sum of the multiplied signals X1~X4 as an estimated signal of a desired mobile station. The weight calculating unit 58 adjusts each weight vector in such a way that minimizes an error between the estimated signal of the desired mobile station and the reference signal outputted from the reference signal generating unit 55.

This is to say, the weight calculating unit 58 presents the received signals X1~X4 by using vector sequences "$x_1(t)$", "$x_2(t)$", "$x_3(t)$", and "$x_4(t)$", which change over time, and presents weight vectors corresponding to the signals X1~X4 by using "$w_1(t)$", "$w_2(t)$", "$w_3(t)$", and "$w_4(t)$", The weight calculating unit 58 then obtains the estimated signal "y(t)" by calculating Expression 3 below. Here, "t" shows a time represented in a unit of a time taken to receive one symbol within a time slot in the PHS standard.

$$y(t)=w_1(t-1)*x_1(t)+w_2(t-1)*x_2(t)+w_3(t-1)*x_3(t)+w_4(t-1)*x_4(t) \qquad \text{Expression 3}$$

After obtaining the estimated signal "y(t)", the weight calculating unit 58 adjusts a value of "w(t−1)" within a predetermined range so as to minimize an error "e(t)" between the reference signal "d(t)" and the estimated signal "y(t)". The adjusted weight vector is then regarded as a weight vector "w(t)" to be used in the next time unit. The error "e(t)" can be obtained by Expression 4 below.

$$e(t)=d(t)-y(t) \qquad \text{Expression 4}$$

Under the control of the control unit 80, the weight selecting unit 57 sets a weight vector calculated by the weight calculating unit 58 during the signal reception from a mobile station as a weight vector that multiplies a quarter of a signal, which has been outputted from the modem unit 60 and corresponds to one mobile station.

Data Construction

The following describes the UW information stored in the UW storing unit 90.

FIG. 4 shows a construction and example contents of the UW information.

As shown in the figure, the UW information associates each UW with a different assignment state of the UW. The UW information contains four types of UWs, such as a 16-bit value of "0011110101001100" represented in binary notation. The assignment state is shown as a value which specifies a mobile station to which a UW is assigned, such as "USER 1" and "USER 2", or as a value showing that a UW has not been assigned to any mobile stations.

Processing

The following describes the processing of the wireless base station 1000 that has the above construction, focusing on the assignment of a UW to a mobile station, which is a characteristic of the present invention.

Figure 5:
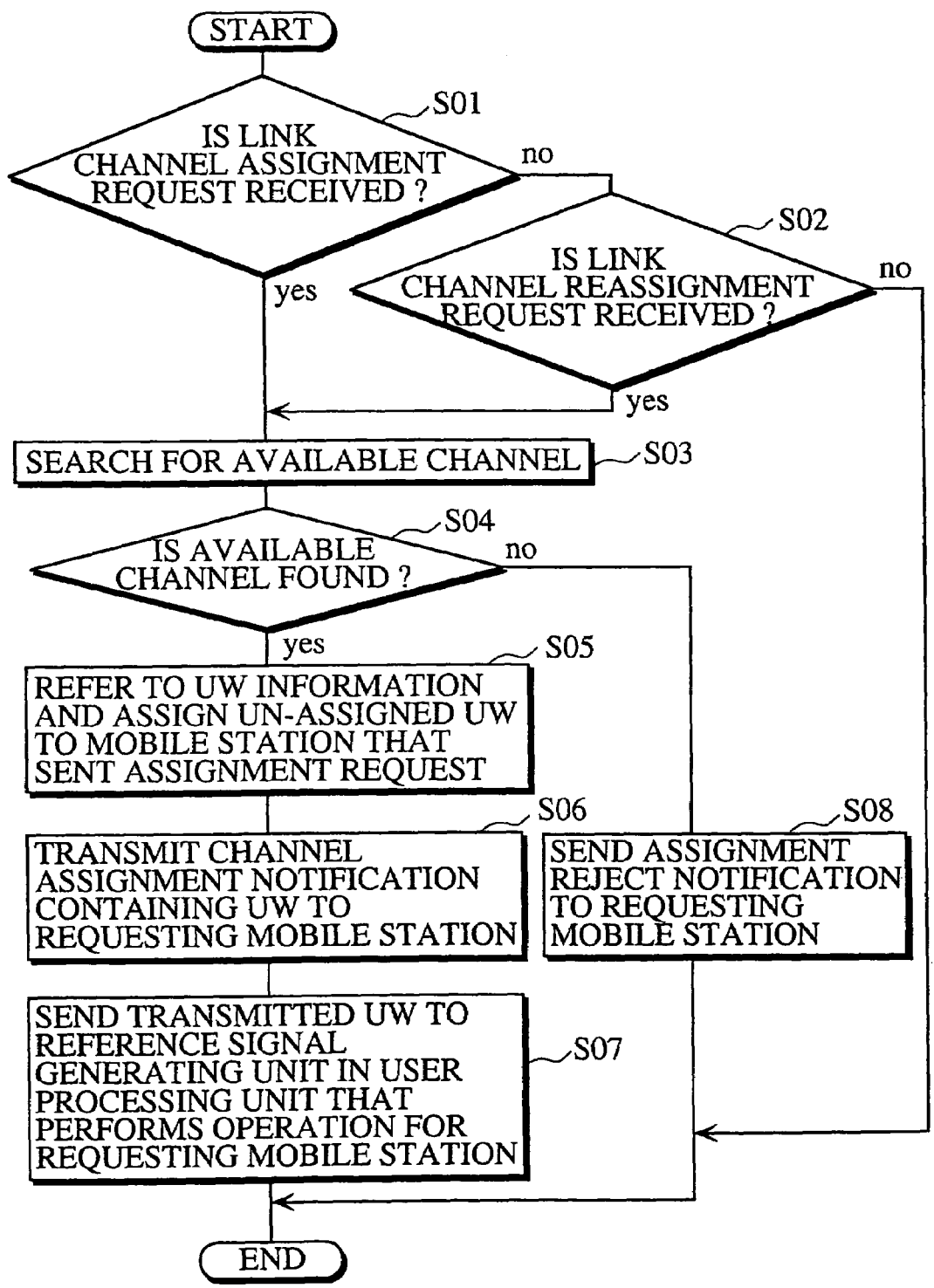
FIG. 5 is a flowchart showing the processing of the wireless base station 1000 when it receives a link channel assignment request from a mobile station to start data transmission or telephone conversation with the mobile. station.

FIG. 5 is a flowchart showing the processing of the wireless base station 1000 when it receives a link channel assignment request from a mobile station to have data transmission or phone conversation started. The processing shown in this flowchart is achieved under the control of the control unit 80.

When receiving, from a mobile station, a link channel assignment request (step S01) or a link channel reassignment request (step S02), the control unit 80 searches for an available channel to be assigned to this mobile station (step S03). When finding no such channel (step S04), the control unit 80 has an assignment reject notification sent to the mobile station (step S08).

When finding a channel (step S04), the control unit 80 refers to the UW information in the UW-storing unit 90 to specify one UW which has not been assigned to any mobile station, and updates the UW information by associating the specified UW with the requesting mobile station (step S05) The control unit 80 then has a channel assignment notification sent to the mobile station (step S06). This channel assignment notification contains the associated UW and notifies that the link channel has been assigned to the mobile station. For instance, if the control unit 80 receives a channel assignment request from a mobile station during a phone conversation being performed by other two mobile stations with the UW storing unit 90 storing the UW information shown in FIG. 4, the control unit 80 updates the UW information by associating a UW "1001011111100110" with a "USER 3" in step S05. After this in step S06, the control unit 80 performs the control to transmit a channel assignment notification containing this UW "1001011111100110" and information which specifies the assigned channel, such as a time slot and a frequency.

After step S06, the control unit 80 sends the assigned UW to a reference signal generating unit in a user processing unit, which is to perform operations for the mobile station to which the channel assignment notification has been sent (step S07). As a result, the reference signal generating unit 55 in the user processing unit 51c, for instance, generates a reference signal, which contains this UW and is an ideal signal to be sent by the mobile station.

Figure 6:
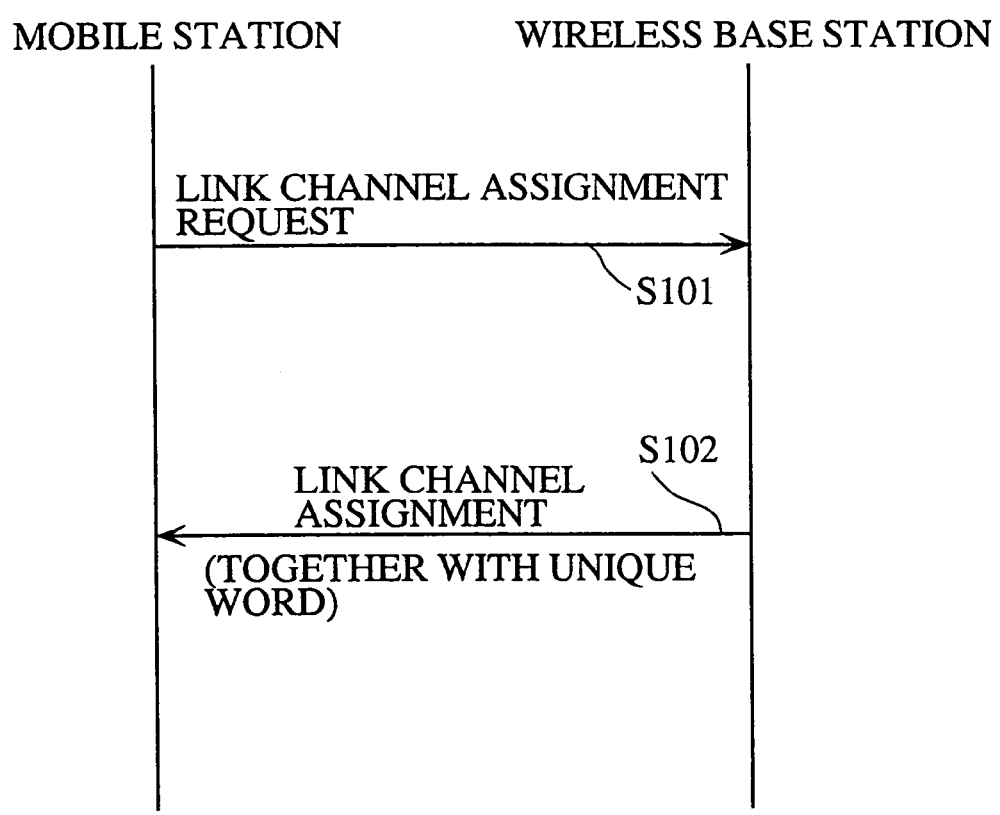
FIG. 6 shows the sequence of link channel assignment in outline between a mobile station and the wireless base station 1000.

FIG. 6 shows the sequence of the link channel assignment in outline between a mobile station and the wireless base station 1000.

As shown in the figure, when receiving the channel assignment request from the mobile station (step S101), the wireless base station 1000 performs the processing in FIG. 5, in which it sends a channel assignment notification containing the assigned UW to the mobile station in step S06 (step S102).

Note that each mobile station has not only a construction conforming to the conventional PHS standard but also a function to use, instead of a UW defined in the PHS standard, a UW contained in the received channel assignment notification so as to establish a physical slot and then transfer communication data to/from a wireless base station using the physical slot. The mobile station perform this function by having its CPU execute a control program stored in memory to control other units of the mobile station.

In this way, the wireless base station 1000 sends a UW to a mobile station with which communication is to be performed. This UW differs from UWs assigned to other mobile stations. The wireless base station 1000 also uses this UW as a part of a reference signal used to separate and extract a signal sent from this mobile station.

Since each mobile station uses a UW sent from the wireless base station 1000 as a UW conforming to the PHS standard to establish a physical slot and communicate via a T channel, the wireless base station 1000 can communicate with this mobile station while suppressing interference with other mobile stations and maintaining good communication quality using the SDM without needing to precisely stagger transmission times of these mobile stations.

Second Embodiment

The following describes a wireless base station of the second embodiment.

The wireless base station of the second embodiment has basically the same construction as the wireless base station 1000 of the first embodiment (see FIG. 1), but differs from the first embodiment in operation contents of a control unit 80 and in that UW information is not generated and stored into a UW storing unit 90 until the wireless base station receives a UW from a mobile station.

Note that each mobile station of the present embodiment has not only a construction conforming to the conventional PHS standard but also functions to determine an appropriate value to be used as a UW, send the UW to the wireless base station when requesting a channel assignment to the base station, and use, instead of a UW defined in the PHS standard, the determined UW for establishing a physical slot and transferring communication data to/from the wireless base station. Each mobile station achieves these functions by having its CPU execute a control program stored in its memory to control other units contained in the mobile station.

Processing

The following describes the processing of the wireless base station of the present embodiment. Here, the same reference numbers as in the first embodiment are assigned to units common to the two embodiments.

Figure 7:
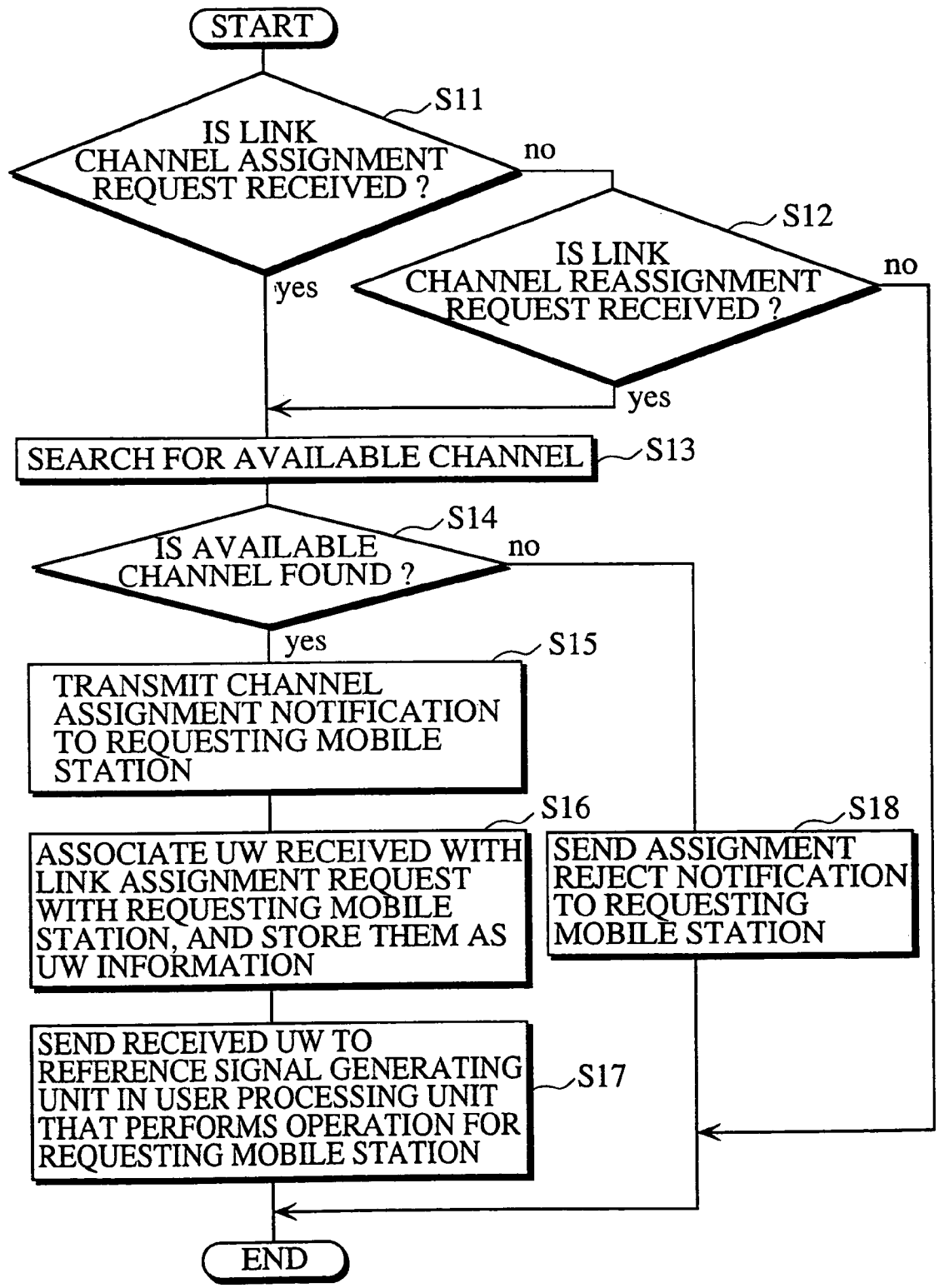
FIG. 7 is a flowchart showing the processing of a wireless base station of the second embodiment when it receives a link channel assignment request from a mobile station to start data transmission or telephone conversation with the mobile station.

FIG. 7 is a flowchart showing the processing of the wireless base station when it receives a link channel assignment request from a mobile station to start data transmission or telephone conversation with the mobile station. The processing shown in this flowchart is performed under the control of the control unit 80.

When receiving, from a mobile station, a link channel assignment request (step S11) or a link channel reassignment request (step S12), the control unit 80 searches for a channel to be assigned to this mobile station (step S13). Together with this request, the mobile station also sends a UW to the wireless base station. When finding no such channel (step S14), the control unit 80 has an assignment reject notification sent to the mobile station (step S18).

When finding an available channel (step S14), the control unit 80 has a channel assignment notification sent to the mobile station (step S15). This assignment notification contains information which specifies the assigned channel, such as a time slot and a frequency.

After sending the assignment notification, the control unit 80 associates the UW, which has been sent from the mobile station together with the channel assignment request, with this mobile station, and stores them into the UW storing unit 90 as UW information (step S16). The control unit 80 then has this UW outputted to a user processing unit, which is to perform operations for this mobile station (step S17). As a result, the reference signal generating unit 55 in the user processing unit 51a, for instance, can generate a reference signal, which contains this UW and is an ideal signal estimated to have been sent from the mobile station.

Figure 8:
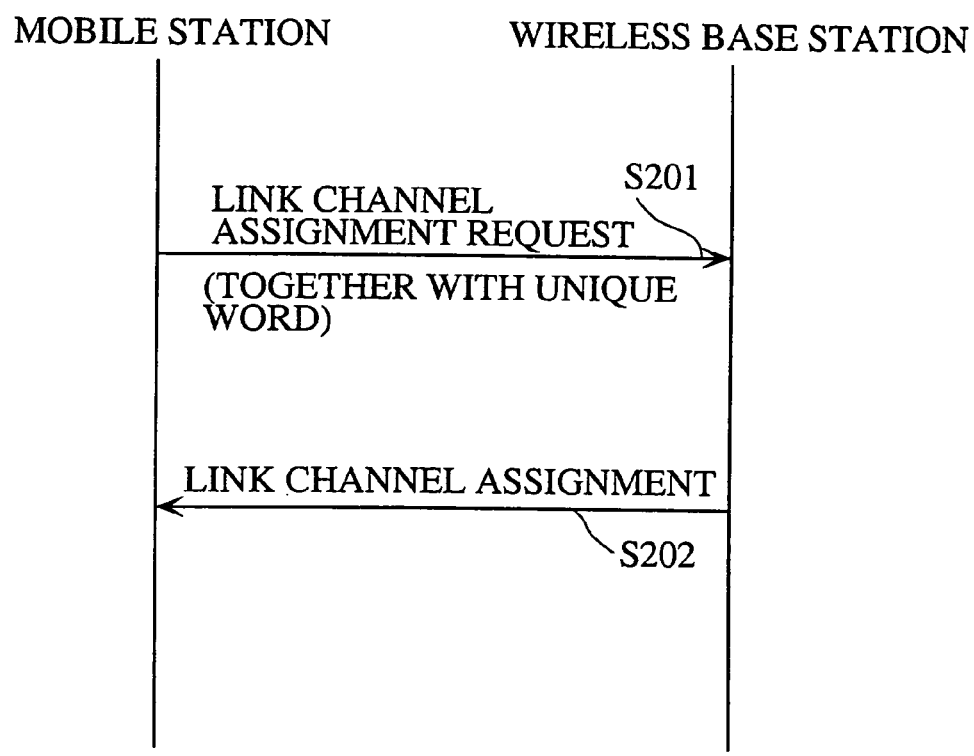
FIG. 8 shows the sequence of the link channel assignment in outline between a mobile station and the above wireless base station.
Figure 9:
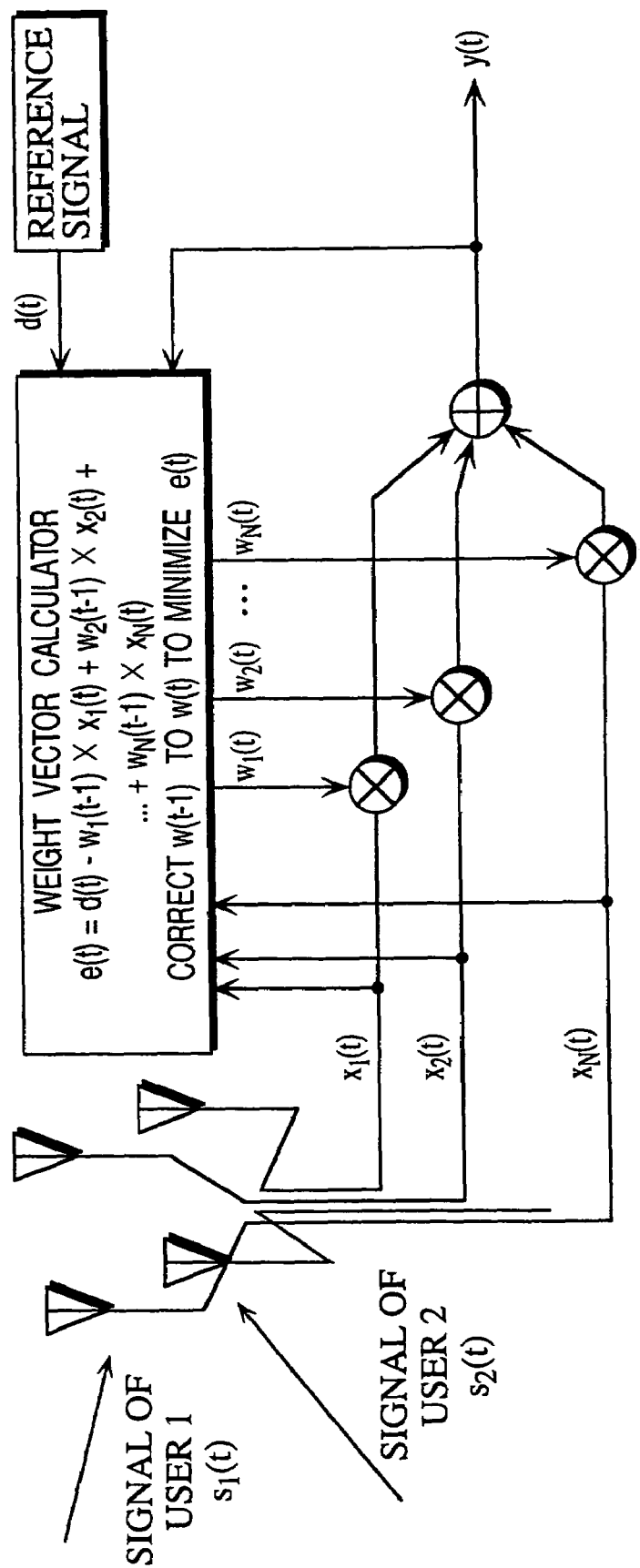
FIG. 9 shows representation of the MMSE controlling operation performed when an adaptive array antenna device receives signals from mobile stations.

FIG. 8 shows the sequence of the link channel assignment in outline between a mobile station and the wireless base station.

As shown in the figure, when receiving the link channel assignment request containing a UW from the mobile station (step S201), the wireless base station performs the processing shown in FIG. 7, in which it sends a channel assignment notification to the mobile station in step S15 (step S202).

In this way, the wireless base station receives, from a mobile station with which it is to start communication, a UW that is used to establish a physical slot defined in the PHS standard for communication via a T channel. The wireless base station then uses the received UW as a part of a reference signal to extract a signal sent from the mobile station. When each mobile station uses a different UW from other mobile stations whose signals are SD-multiplexed, and sends this UW to the wireless base station, the wireless base station can communicate with each mobile station while suppressing interference with other mobile stations and maintaining good communication quality.

Supplementary Explanation

The above embodiments have been used to describe the wireless base station and the mobile station of the present invention although it should be clear that the present invention is not limited to these embodiments. Possible modifications are described below.

(1) The above embodiments describe the present invention, using a wireless base station and a mobile station in the PHS system. The present invention, however, may be applied to a communication system in which each mobile station sends/receives communication data containing a word for synchronization, which corresponds to a UW used to establish a physical slot conforming to the PHS standard. The word for synchronization should be a bit sequence used as an identifier.

(2) A UW is sent from the wireless base station 1000 to a mobile station in the first embodiment while in the second embodiment a UW is sent from a mobile station to the wireless base station. Instead of such UW itself, identification information that specifies the UW, such as identification numbers like "1", "2", "3", and "4" may be used. In this case, it is necessary that both the wireless base station and a mobile station are capable of obtaining the UW value based on the identification information such as by performing a calculation. For instance, this identification information may be an unused bit sequence contained in a channel assignment message defined in the PHS standard.

(3) The first embodiment states that the UW storing unit 90 stores UW information containing four fixed values as UWs in advance and that the control unit 80 outputs a UW out of the four UWs to each reference signal generating unit in the user processing units 51a~51d. However, instead of having the UW storing unit 90 store fixed UW values, four UW values may be generated such as by having the control unit 80 generate random numbers and include them in the UW information.

(4) In the second embodiment, each mobile station determines a UW such as by generating a random number, and then sends this UW to the wireless base station, which does not necessarily check the sent UW value. However, if the sent UW is the same as a UW used by another mobile station whose signals are SD-multiplexed together, the wireless base station may send a channel assignment rejection notification which notifies the requesting mobile station that a UW other than the sent UW should be used since the sent UW is the same as a UW of another mobile station.

(5) On completing communication with a mobile station, the wireless base station of the present invention may update the UW information to delete the association of this mobile station with a stored UW although this is not described in the above embodiments.

(6) The wireless base station determines a pattern of scrambling to be performed-for a security reason on body data (i.e., the content) of communication with a mobile station although this is not described in the above embodiments. Since a different scrambling pattern is used for each mobile station, a signal determined by each scrambling pattern may be included in a reference signal generated by a reference signal generating unit for each mobile station.

I claim:

1. A wireless phone that wirelessly communicates with a wireless base station capable of transmitting a different word for synchronization to each of a plurality of mobile phones with which the wireless base station wirelessly communicates by using space division multiplexing, comprising:

receiving means for receiving the word for synchronization sent from a wireless base station; and sending means for sending the word for synchronization to the wireless base station, the word for synchronization being sent preceding a main data that is a content of communication, wherein the wireless base station extracts communication data relating to a wireless phone with which the wireless base station is communicating, by:

(a) defining a reference signal containing a word for synchronization that is sent to the wireless phone with which the wireless base station is communicating;

(b) obtaining a second signal that is estimated to be a signal relating to the communication data by forming a directivity pattern, using a plurality of first signals that are seguentially received via an antenna;

(c) sequentially calculating based on the reference signal and the second signal;

(d) adiusting the second signal by seguentially adiusting the directivity pattern by reflecting a result of the calculation; and (e) regarding the adjusted second signal as communication data sent from the wireless phone with which the wireless base station is communicating.

2. A wireless phone, comprising:

receiving means for receiving a word for synchronization sent from a wireless base station; and sending means for sending the word for synchronization to the wireless base station, the word for synchronization being sent preceding a main data that is a content of communication, wherein the wireless base station extracts communication data relating to a wireless phone with which the wireless base station is communicating, by:

(a) defining a reference signal containing a word for synchronization that is sent to the wireless phone with which the wireless base station is communicating;

(b) obtaining a second signal that is estimated to be a signal relating to the communication data by forming a directivity pattern, using a plurality of first signals that are sequentially received via an antenna;

(c) sequentially calculating based on the reference signal and the second signal;

(d) adjusting the second signal by sequentially adjusting the directivity pattern by reflecting a result of the calculation; and (e) regarding the adjusted second signal as communication data sent from the wireless phone with which the wireless base station is communicating.

* * * * *